United States Patent [19]

Lindvay

[11] 4,051,101
[45] Sept. 27, 1977

[54] HALOGENATED ISOTHIURONIUM SALTS AS FLAME RETARDANTS

[75] Inventor: Michael W. Lindvay, Ann Arbor, Mich.

[73] Assignee: Velsicol Chemical Corporation, Chicago, Ill.

[21] Appl. No.: 704,335

[22] Filed: July 12, 1976

[51] Int. Cl.² .................. C08K 5/29; C07C 123/00
[52] U.S. Cl. .................. 260/45.85 R; 106/177; 106/178; 106/190; 260/2.5 FP; 260/2.5 AJ; 260/45.9 AM; 260/564 E
[58] Field of Search .......... 260/45.9 AM, 564 E, 260/2.5 FP, 2.5 AJ, 45.85 R; 106/177, 178, 190

[56] References Cited

U.S. PATENT DOCUMENTS

| | | | |
|---|---|---|---|
| 2,815,333 | 12/1957 | Klein et al. | 260/45.9 AM |
| 3,269,901 | 8/1966 | Schnell et al. | 260/564 E |
| 3,334,989 | 8/1967 | Imel et al. | 260/564 E |
| 3,513,197 | 5/1970 | Daum et al. | 260/564 E |
| 3,636,075 | 1/1972 | Loev | 260/564 E |
| 3,825,597 | 7/1974 | Diamond | 260/564 E |

*Primary Examiner*—V. P. Hoke
*Attorney, Agent, or Firm*—Robert M. Phipps

[57] ABSTRACT

Compounds of the formula

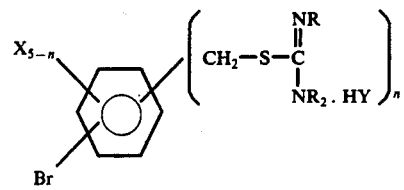

wherein each X is independently selected from a group consisting of hydrogen, chlorine, bromine, alkyl, and haloalkyl, said alkyl containing 1 to 6 carbon atoms and said haloalkyl of 1 to 6 carbon atoms containing 1 to 3 halogen atoms, each halogen being independently selected from chlorine and bromine; each Y is independently selected from a group consisting of halogen, hydrogen phosphate, hydrogen sulfate, nitrate, acetate, alkali-metal phosphate, and alkali-metal sulfate; each R is independently selected from the group consisting of hydrogen, alkyl and haloalkyl, said alkyl containing 1 to 3 carbon atoms and said haloalkyl of 1 to 3 carbon atoms containing 1 to 3 halogen atoms, said halogen atoms being selected from chlorine and bromine; and $n$ is an integer from 1 to 5, are effective flame retardants for polyurethane, polyester, and sytrenic polymeric compositions.

22 Claims, No Drawings

HALOGENATED ISOTHIURONIUM SALTS AS FLAME RETARDANTS

BACKGROUND OF THE INVENTION

1. Field of the Invention

Halogenated isothiuronium salts are useful as flame retardants for polyurethane, polyester, and styrenic polymeric compositions.

2. Description of the Prior Art

During the past several years, a large number of flame retardants have been developed for use with an almost equally large number of flammable materials. Cellulosic materials such as paper and wood, and polymeric materials such as synthetic fibers and bulkier plastic articles are just two examples of the materials for which flame retardants have been developed. For any class of flammable materials, such as synthetic high polymers, those skilled in the art have long been aware that some flame retardant additives are more effective in polymers and polymeric compositions than other flame retardant additives. This is because the efficacy of any flame retardant in polymers or polymeric compositions is measured not only by the flame retarding capability of the additive but also by the ability of the additive to improve or modify, or at least not to detract from, other physical or mechanical properties of the polymer or polymeric composition. The mere fact, therefore, that most flame retardants contain halogen, phosphorus, and/or nitrogen atoms does not assure that any given halogenated or phosphorus or nitrogen-containing compound will impart useful flame retarding characteristics to all or even to any polymeric system. Furthermore, as those skilled in the art have improved the flame retardancy of many polymeric materials, they have been simultaneously required to provide the necessary flame retardancy with a minimal effect upon other properties of the polymers such as their light stability, processability and flexural, tensile and impact strengths. Balancing all of the foregoing considerations and thereby developing polymeric compositions with good flame retardant characteristics as well as a satisfactory balance of other properties is, consequently, a task which has in the past and presently continues to require the exercise of a high degree of inventive skill.

Previously it has been known that certain isothiuronium salts were useful in the control of plant growth, fungus, algae and the like. U.S. Pat. No. 2,640,079 discloses the use of alkylbenzylthiuronium salts as bactericides and fungicides. In U.S. Pat. No. 2,708,679 thiouronium pentachlorophenates are disclosed as useful herbicides. In a still later U.S. Pat. No. 3,513,197, S-benzylisothiuronium chlorides (as well as chloro and/or alkyl substituted) are useful as inhibiting algae. Finally, British Pat. No. 936,766 discloses that polychlorobenzyl mono- and bis-isothiuronium chlorides are useful as rodent repellents. It has now been found that certain bromophenyl isothiuronium salts are useful as flame retardants in polymeric compositions.

SUMMARY OF THE INVENTION

In accordance with this invention there are provided bromophenyl isothiuronium salts of the formula

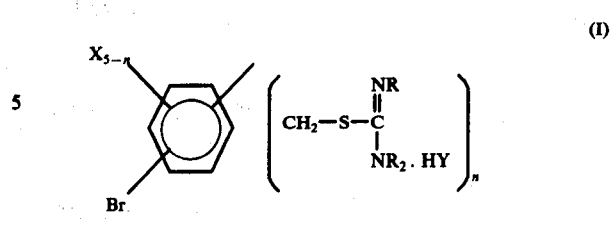

wherein each X is independently selected from a group consisting of hydrogen, chlorine, bromine, alkyl, and haloalkyl, said alkyl containing 1 to 6 carbon atoms and said haloalkyl of 1 to 6 carbon atoms containing 1 to 3 halogen atoms, each halogen being selected from chlorine and bromine; each Y is independently selected from a group consisting of halogen, hydrogen phosphate, hydrogen sulfate, nitrate, acetate, alkali-metal phosphate and alkali-metal sulfate; each R is independently selected from the group consisting of hydrogen, alkyl and haloalkyl groups, said alkyl containing 1 to 3 carbon atoms and said haloalkyl of 1 to 3 carbon atoms containing 1 to 3 halogen atoms, each halogen being selected from chlorine and bromine; and wherein $n$ is an integer from 1 to 5. The salts of this invention are useful as flame retardants for polyurethane, polyester and styrenic polymeric compositions.

DESCRIPTION OF THE PREFERRED EMBODIMENTS

The salts of this invention are graphically described by formula I. Each X is independently selected from a group consisting of hydrogen, chlorine, bromine, alkyl, and haloalkyl, said alkyl containing 1 to 6, preferably 1 to 3, carbon atoms and said haloalkyl of 1 to 3 carbon atoms containing 1 to 3, preferably 1 to 2, halogen atoms, each halogen being independently selected from chlorine and bromine. Preferably, each X is independently selected from chlorine and bromine. It is also preferred that all X substituents be identical. Most preferably each X substituent is bromine.

Each Y is independently selected from a group consisting of halogen, hydrogen phosphate, hydrogen sulfate, nitrate, acetate, alkali-metal phosphate, and alkali-metal sulfate. Preferably, each Y is halogen and more preferably each Y is independently selected from chlorine and bromine. Further, it is also preferred that all Y substituents be identical.

Each R is independently selected from the group consisting of hydrogen, alkyl, and haloalkyl, said alkyl containing 1 to 3 carbon atoms, and said haloalkyl of 1 to 3 carbon atoms containing 1 to 3, preferably 1 to 2, halogen atoms, each halogen being independently selected from chlorine and bromine. Preferably all R substituents are hydrogen.

Lastly, $n$ is an integer from 1 to 5, preferably from 2 to 4.

For purposes of illustration only, Table I is designed to help exemplify the salts of formula I of this invention and is neither meant nor should it be taken to be a complete listing of all the compounds of this invention.

TABLE I

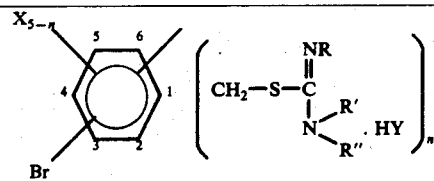

Substituent at Indicated Position on Aryl Group (X column includes ring Br)

| | 1 | | | | | 2 | | | | 3 | | 4 | | | | 5 | | | | 6 |
|---|---|---|---|---|---|---|---|---|---|---|---|---|---|---|---|---|---|---|---|---|
| Compound | Y | R | R' | R" | X | Y | R | R' | R" | X | X | Y | R | R' | R" | X | Y | R | R" | X |
| 1 | Br | H | H | H | Br | — | — | — | — | Br | — | Br | H | H | H | Br | — | — | — | — | Br |
| 2 | Cl | H | H | H | Br | — | — | — | — | Br | — | Cl | H | H | H | Br | — | — | — | — | Br |
| 3 | Br | H | H | H | Br | — | — | — | — | Br | Br | — | — | — | — | Br | — | — | — | — | Br |
| 4 | Cl | H | H | H | Br | — | — | — | — | Br | Br | — | — | — | — | Br | — | — | — | — | Br |
| 5 | Br | H | H | H | — | Br | H | H | H | Br | — | Br | H | H | H | Br | — | — | — | — | Br |
| 6 | Cl | H | H | H | — | Cl | H | H | H | Br | — | Cl | H | H | H | Br | — | — | — | — | Br |
| 7 | Br | H | H | H | Br | — | — | — | — | Cl | — | Br | H | H | H | Cl | — | — | — | — | Cl |
| 8 | Cl | H | H | H | Br | — | — | — | — | Cl | — | Cl | H | H | H | Cl | — | — | — | — | Cl |
| 9 | Br | H | H | H | Cl | — | — | — | — | Cl | Br | — | — | — | — | Cl | — | — | — | — | Cl |
| 10 | Cl | H | H | H | Cl | — | — | — | — | Cl | Cl | — | — | — | — | Br | — | — | — | — | Cl |
| 11 | Br | H | H | H | — | Br | H | H | H | Cl | — | Br | H | H | H | Cl | — | — | — | — | Br |
| 12 | Cl | H | H | H | — | Cl | H | H | H | Cl | — | Cl | H | H | H | Br | — | — | — | — | Cl |
| 13 | b | c | c | c | a | — | — | — | — | Br | a | — | — | — | — | Br | — | — | — | — | Br |
| 14 | e | H | H | H | Cl | — | — | — | — | Br | d | — | — | — | — | Cl | — | — | — | — | Cl |
| 15 | f | H | H | g | a | — | — | — | — | H | a | — | — | — | — | Br | — | — | — | — | H |
| 16 | i | H | c | c | H | — | — | — | — | H | h | — | — | — | — | H | — | — | — | — | Br |
| 17 | Cl | H | c | c | H | — | — | — | — | Br | — | Br | H | c | c | H | — | — | — | — | Cl |
| 18 | Br | H | H | H | — | Br | H | H | H | a | — | Br | H | H | H | a | — | — | — | — | Br |
| 19 | Cl | H | H | H | — | Cl | H | H | H | Cl | Cl | — | — | — | — | Br | — | — | — | — | Cl |
| 20 | Br | H | H | H | — | Br | H | H | H | Br | — | Br | H | H | H | — | Br | H | H | H | Br |

*a*—CH₂Br.
*b*—CH₃.
*c*—Na₂PO₄⁻.
*d*—CH₂CHBrCH₂Br.
*e*—CH₃C(O)O.
*f*—NO₃⁻.
*g*—(CH₂)₃CH₃.
*h*—HSO₄⁻.
*i*—CH₂—C(CH₂Br)₃.

Exemplary preferred compounds within the scope of this invention include S,S'-(2,3,5,6-tetrabromoxylylene)-bis-isothiuronium bromide, S,S'-(2,3,5,6-tetrabromoxylylene)-bis-isothiuronium chloride, S-(2,3,4,5,6-pentabromobenzyl)-isothiuronium bromide, S-(2,3,4,5,6-pentabromobenzyl)-isothiuronium chloride, S,S',S"-(3,5,6-tribromo-1,2,4-trimethylphenylene)-tris-isothiuronium bromide, S,S',S"-(3,5,6-tribromo-1,2,4-trimethylphenylene)-tris-isothiuronium chloride, S,S'-(2-bromo-3,5,6-trichloroxylylene)-bis-isothiuronium bromide, S-(2,4,6-tribromo-3,5-dichlorobenzyl)-isothiuronium bromide, and S,S',S"-(3,5-dichloro-6-bromo-1,2,4-trimethylphenylene)-tris-isothiuronium bromide.

The compounds within the scope of this invention can be prepared by the following general reaction scheme:

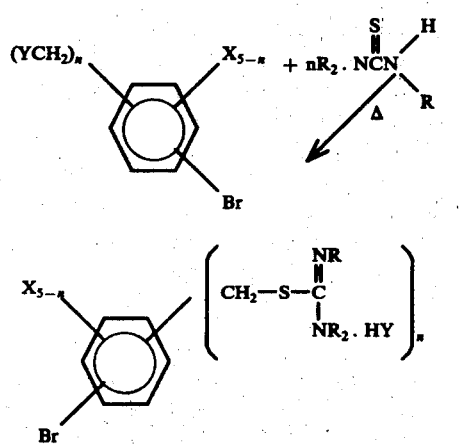

wherein X, Y, R and n are as defined above. In general n moles of thiourea or suitable derivative are reacted with one mole of a phenyl radical containing n halomethyl substituents. This reaction can be carried out in the presence or absence of a solvent, preferably in the presence of a solvent. Exemplary solvents include water or organic solvents such as alcohols, e.g., ethanol, propanol, etc., aromatic solvents, e.g., benzene, etc., ethers, e.g., dioxane, etc., and aprotic dipolar solvents, e.g., dimethyl formamide. Alcohols are the preferred solvents to be used in the above reaction. The above reactants are refluxed for a period of about one to about 6 hours, preferably for about 3 hours. The end product may optionally be purified by techniques which are well known to those skilled in the art. For example, one can wash the final product with water or any suitable organic solvent to remove any residual unreacted materials. Alcohols and ethers are exemplary organic solvents which can be used in the washing procedure. After washing, one can filter the washed end product and then dry the residue in a forced air oven at a temperature of about 80° to about 110° C. or in a vacuum oven at a temperature of about 20° to about 100° C. until constant weight is achieved.

The compounds of this invention are useful flame retardants in polymeric compositions selected from the group consisting of polyurethane, including flexible and rigid foams and elastomers, polyester, both saturated and unsaturated polyester, and styrenic polymers such as polystyrene, including both crystalline and high impact types, and styrene co- and terpolymers such as styrene-butadiene copolymer, styrene-acrylonitrile copolymer, and acrylonitrile-butadiene-styrene terpolymers. A further description of above polymers applicable to the present invention may be found in Modern Plastics Encyclopedia, Vol. 52, No. 10A, McGraw-Hill, Inc., New York, New York (1975), said publication being incorporated herein in toto by reference. The flame retardants of this invention are especially desirable in polyester polymers.

It is also contemplated that the flame retardants of this invention possess excellent flame retardant efficacy in polyamides, cellulosic and epoxy polymeric compositions. A detailed description of polyamide polymers and epoxy resins can be found in Modern Plastics Encyclopedia, ibid.

The flame retardants of this invention may be incorporated into or applied onto flammable polyurethane, polyester, and styrene polymeric material by techniques which are standard or known to those skilled in the art. See, for example, J. M. Lyons, "The Chemistry and Uses of Fire Retardants," Wiley-Interscience, New York, N. Y. (1970), and Z. E. Jolles, "Bromine and Its Compounds," Academic Press, New York, New York (1966). Depending on the substrate and the amount of flame retardancy desired, from about 1 to about 40 weight percent of the salt of this invention can be incorporated therewith. It should be noted that the optimum level of additive of the flame retardant salt of this invention depends upon the particular substrate being treated as well as the level of flame retardancy desired. In polyesters the preferred flame retardant level is from about 10 to about 35 percent by weight of the total polymeric composition. In polyurethane compositions it is preferred to use from about 25 to about 40 percent by weight of the polyol (i.e., parts per hundred polyol) to achieve suitable flame retardancy while maintaining the desired physical properties. In contrast it is preferred in styrenic polymers, e.g., polystyrene, to use from about 5 to about 25 percent by weight of the polymer.

In addition to the flame retardant compounds within the scope of this invention, the flame retardancy of a polymer can be further enhanced through the use of so-called "synergists" or enhancing agents, although preferably no synergist or enhancing agent is used in polyurethane or polyester polymers in conjunction with the flame retardant isothiuronium salts of this invention. These "enhancing agents" comprise the oxides and halides of groups IVA and VA of the Periodic Table, and are further described in Modern Plastics Encyclopedia, ibid., as well as U.S. Pat. NOs. 2,993,924; 2,996,528; 3,205,196 and 3,878,165. Without limitation, preferred enhancing agents include $Sb_2O_3$, $SbCl_3$, $SbBr_3$, $SbI_3$, SbOCl, $As_2O_3$, $As_2O_5$, $ZnBO_4$, $BaB_2O_4 \cdot H_2O$, $2ZnO \cdot 3B_2O_3 \cdot 3.5H_2O$ and stannous oxide hydrate. The more preferred enhancing agent is antimony trioxide. Additionally, for styrenic polymers such as polystyrene it has been established that organic peroxides and disulfides are useful enhancing agents. Typical of such agents are dicumyl peroxide, tertiary butyl hydroperoxide, methylisobutyl ketone peroxide, tertiary butyl perbenzoate, potassium persulfate, tertiary butyl peracetate, xylyl disulfide, butylxanthic sulfide and poly(p-tertamylphenol disulfide). The foregoing organic enhancing agents and others are further described in U.S. Pat. Nos. 3,058,926; 3,058,927; 3,284,544 and 3,271,331, which are incorporated herein by reference. When used, the enhancing agent is typically used in an amount up to about 10 percent.

It is also within the scope of the present invention to employ other materials in the present invention compositions where one so desires to achieve a particular end result. Such materials include, without limitation, adhesion promotors; antioxidants; antistatic agents; antimicrobials; colorants; heat stabilizers; light stabilizers and fillers. The above mentioned materials, including filler, are more fully described in Modern Plastics Encyclopedia, ibid., and which publication has been incorporated herein in toto by reference.

The amount of the above described materials employed in the present invention compositions can be any quantity which will not substantially adversely affect the desired results derived from the present invention compositions. Thus, the amount used can be zero (0) percent, based on the total weight of the composition, up to that percent at which the composition can still be classified as a plastic. In general, such amount will be from about 0% to about 75% and more specifically from about 1% to about 50%.

The following examples are provided for the purpose of further illustration only and are not intended to be limitations on the disclosed invention. Unless otherwise specified, all temperatures are expressed in degrees centigrade; all weights are expressed in grams; and all volumes are expressed in milliliters.

EXAMPLE 1

Preparation of S,S'-(2,3,5,6-tetrabromoxylylene)-bis-isothiuronium bromide (compound 1, Table I) (hereinafter for convenience referred to as TXIB):

Into a 50-milliliter beaker containing 40 ml of ethanol was added 1.05 gm of thiourea. This solution was heated and the thiourea dissolved with stirring. To this solution was then added 4 gm of alpha, alpha'-2,3,5,6-hexabromoxylene slowly over a 20 minute period. The reaction mixture was then boiled and stirred for an additional 40 minutes after which the reaction mixture was filtered under vacuum and the filter cake was washed with 50 ml of ethanol. The resulting white powder was dried in an oven at 40° C. under a vacuum for 1 hour. The resultant TXIB product had a melting point of 282° to 284° C.

Analysis for $C_{10}H_{12}Br_6N_4S_2$: Calculated: Br, 64.5%; Found: Br, 69.2%.

In a similar manner, other flame retardants within the scope of this invention, e.g., S,S'-(2,3,5,6-tetrabromoxylylene)-bis-isothiuronium chloride, S-(2,3,4,5,6-pentabromobenzyl)-isothiuronium bromide, S-(2,3,4,5,6-pentabromobenzyl)-isothiuronium chloride, S,S',S''-(3,5,6-tribromo-1,2,4-trimethylphenyl)-tris-isothiuronium bromide, S,S',S''-(3,5,6-tribromo-1,2,4-trimethylphenyl)-tris-isothiuronium chloride, S,S'-(2-bromo-3,5,6-trichloroxylylene)-bis-isothiuronium bromide, S-(2,4,6-tribromo-3,5-dichlorobenzyl)-isothiuronium bromide, S-(2,4,6-tribromo-3,5-dichlorobenzyl)-isothiuronium chloride, S,S',S''-(3,5,-dichloro-6-bromo-1,2,4-trimethylphenyl)-tris-isothiuronium bromide, and S,S',S''-(3,5-dichloro-6-bromo-1,2,4-trimethylphenyl)-tris-isothiuronium chloride.

EXAMPLE 2

Into an unsaturated polyester general purpose (unhalogenated) resin (hereinafter referred to as a "GP resin") at 30% styrene was mixed another 5% styrene (Koppers 2000–25 brand GP resin at 30% styrene, Koppers Company, Pittsburgh, Pa. Into the above mixture was added 0.5 parts per hundred resin (phr) of a 6% solution of cobalt naphthelate promoter. This was followed by the addition of 15 phr of TXIB (Example 1). Next was added 1.0 phr methyl ethyl ketone peroxide catalyst. The above resin-flame retardant mixture was used to make a laminate as follows: Using three separate one-ply, 1.5 ounce per square foot, class E glass mats, (1) Put down one ply of said glass mats on a polyester film (Mylar brand polyester film, E. I. du Pont de Nemours & Co., Wilmington, Delaware). (2) Coat above glass mat with above resin-flame retardant mixture. (3) Using a roller, roll said mixture into the glass mat. (4) Repeat above steps 1 to 3 building a three-ply GP resin fire retardant laminate. (5) Put another sheet of polyester film on top. (6) Roll top of film to remove all air pockets. (7) Cure at room temperature (about 25° C.) for about 16 hours. (8) Postcure for one hour at 100° C. (9) The above flame retardant laminate was subject to the Oxygen Index test, ASTM D-2863-74, and the data obtained therefrom reported in Table II below.

Additional GP resin laminate samples were prepared which contained different levels of flame retardant additive as well as a control. These samples were tested in the same manner and the results obtained are also reported in Table II.

TABLE II

| Flame Retardant Additive | Load Level | OI, percent |
|---|---|---|
| Control | 0 phr | 20.3 |
| TXIB | 15 phr | 24.8 |
| TXIB | 25 phr | 29.0 |
| TXIB | 35 phr | 36.0 |

EXAMPLE 3

A solution of 600 grams of polystyrene and 5 parts per hundred resin (phr) of TXIB, in 2670 grams of methylene chloride and 60 grams of hexane was prepared. To the above solution was added 3 grams of dicumyl peroxide as a flame retardant synergist. This mixture was poured into an aluminum dish and the methylene chloride was allowed to evaporate. The casting was then steamed to produce a crude foam. This foam was cut into specimens of appropriate sizes and flame retardancy determined by the Oxygen Index method (O.I.) ASTM D-2863-74. An oxygen index value of 23.5 was obtained.

Additional samples of polymer without any fire retardant additive were prepared as a control. The OI value of the control was 19.5.

EXAMPLE 4

A foam was prepared using the following basic formulation:

| Component | Parts per Hundred Parts Polyol (php) |
|---|---|
| Polyol[a] | 100 |
| Silicone Glycol Surfactant[b] | 2 |
| Trichlorofluoromethane[c] | 35 |
| Polyisocyanate[d] | 135 |
| Flame Retardant | 30 |

[a]alkanolamine polyol, molecular weight approximately 3500, hydroxyl number approximately 530, Thanol R-350-X, Jefferson Chemical Co., Houston, TX.
[b]Dow Corning 193, Dow Corning Corp., Midland, MI.
[c]Freon 11B, E. I. Du Pont de Nemours & Co., Wilmington, DE.
[d]Polymeric aromatic isocyanate, 31.5% available NCO, Mondur MRS, Mobay Chemical Co., Pittsburgh, PA.

The polyol, surfactant, and fluorocarbon blowing agent were combined in a masterbatch based on 1000 gm of polyol to minimize loss of blowing agent.

The following procedure was used to prepare the foam:

1. The polyisocyanate was weighed into a tared, 10 ounce, paper cup (allowances being made for hold-up) and the cup set aside while the remaining ingredients were weighed out and mixed.
2. The polyol masterbatch was weighed out, in the proper amount to give 100 grams of polyol, in a one quart, untreated, paper cup.
3. The desired amount of the flame retardant specified was then weighed into the same one quart cup.
4. The contents of the one quart cup were mixed at 1000 rpm for 5 seconds.
5. The polyisocyanate was then added and stirring at 1000 rpm continued for 10 seconds.
6. The mix was poured into a 5-pound, untreated, paper tub and allowed to rise.

After the foam was tack-free, and substantially cured, it was set aside for at least 7 days prior to subjecting said foam to an Oxygen Index test, ASTM D-2873-74. The results of said test are reported in Table III.

The same procedure was used to made other foams without any flame retardant additive present. These foams were also subjected to the same Oxygen Index test as the above foam and the data are also reported in Table III.

TABLE III

| Flame Retardant | Load Level, php | OI, percent |
|---|---|---|
| Control | 0 | 21.0 |
| TXIB | 30 | 24.0 |

As with TXIB, other compounds within the scope of this invention, e.g., S,S'-(2,3,5,6-tetrabromoxylylene)-bis-isothiuronium chloride, S-(2,3,4,5,6-pentabromobenzyl)-isothiuronium bromide, S-(2,3,4,5,6-pentabromobenzyl)-isothiuronium chloride, S,S',S"-(3,4,6-tribromo-1,2,4-trimethylphenylene)-tris-isothiuronium bromide, S,S',S"-(3,5,6-(tribromo-1,2,4-trimethylphenylene)-tris-isothiuronium chloride, S,S'-(2-bromo-3,5,6-trichloroxylylene)-bis-isothiuronium bromide, and S-(2,4,6-tribromo-3,5-dichlorobenzyl)-isothiuronium bromide, will display similar flame retardant efficacy in polyurethane, polyester, and styrene polymers.

EXAMPLE 5

The thermal stability of TXIB was determined by the procedure set forth in Section 9-951, "Thermogravimetric Analyzer," of "Instruction Manual 990, Thermal Analyzer and Modules," E. I. du Pont de Nemours and Co. (Inc.), Instrument Products Division, Wilmington, Delaware 19898. The results of the thermogravimetric analyses (TGA) at several different weight losses are tabulated in Table IV below:

TABLE IV

| TGA Results for TXIB Temperature at which Weight Change Occurs, ° C. | |
|---|---|
| 5% Weight Loss | 315 |
| 10% Weight Loss | 320 |
| 25% Weight Loss | 330 |
| 50% Weight Loss | 345 |
| 75% Weight Loss | 460 |

The excellent thermal stability of the compounds of this invention has significant commercial implications. Because the compounds of formula I possess a high resistance against thermal degradation, said compounds can be processed and molded without significant weight losses at temperatures wherein many known flame retardants exhibit substantial weight losses such that said known flame retardants are not commercially capable of being used in polymeric compositions requiring high processing and/or molding temperatures.

Based on this disclosure, many other modifications and ramifications will naturally suggest themselves to those skilled in the art. These are intended to be comprehended as within the scope of this invention.

The embodiments of the invention in which an exclusive property or privilege is claimed are defined as follows:

1. Bromophenyl isothiuronium salts of the formula:

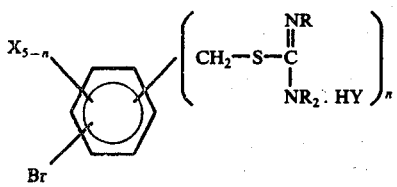

wherein:
each X substituent is independently selected from a group consisting of hydrogen, chlorine, bromine, alkyl, and haloalkyl, said alkyl containing 1 to 6 carbon atoms and said haloalkyl of 1 to 6 carbon atoms containing 1 to 3 halogen atoms, said halogen being independently selected from chlorine and bromine;
each Y substituent is independently selected from a group consisting of halogen, hydrogen phosphate, hydrogen sulfate, nitrate, acetate, alkali-metal phosphate, and alkali-metal sulfate;
each R substituent is independently selected from the group consisting of hydrogen, alkyl and haloalkyl, said alkyl containing 1 to 3 carbon atoms and said haloalkyl of 1 to 3 carbon atoms containing 1 to 3 halogen atoms, said halogen being selected from chlorine and bromine; and
$n$ is an integer from 2 to 4.

2. A salt according to claim 1 wherein each Y substituent is halogen.

3. A salt according to claim 2 wherein each R substituent is hydrogen.

4. A salt according to claim 3 wherein each X substituent is independently selected from chlorine and bromine.

5. A salt according to claim 4 wherein each Y substituent is independently selected from the group consisting of chlorine and bromine.

6. A salt according to claim 5 wherein all X substituents are identical and wherein all Y substituents are identical.

7. A salt according to claim 1 wherein said compound is selected from the group comprising S,S'(2,3,5,6-tetrabromoxylylene)-bis isothiuronium bromide, S,S'-(2,3,5,6-tetrabromoxylylene)-bis-isothiuronium chloride, S,S',S''-(3,5,6-tribromo-1,2,4-trimethylphenylene)-tris-isothiuronium bromide, S,S',S''-(3,5,6-tribromo-1,2,4-trimethylphenylene)-tris-isothiuronium chloride, S,S'-(2-bromo-3,5,6-trichloroxylylene)-bis-isothiuronium bromide, S,S'-(2-bromo-3,5,6-trichloroxylylene)-bis-isothiuronium chloride, S,S'-S''-(3,5-dichloro-6-bromo-1,2,4-trimethylphenylene)-tris-isothiuronium bromide, and S,S',S''-(3,5-dichloro-6-bromo-1,2,4-trimethylphenylene)-tris-isothiuronium chloride.

8. A salt according to claim 1 wherein the salt is S,S'-(2,3,5,6-tetrabromoxylylene)-bis-isothiuronium bromide.

9. A flame retardant polymeric composition comprising a polymer selected from the group comprised of polyurethane, polyester, styrenic polymers, polyamides, cellulosic polymers, and epoxy polymers and a flame retarding amount of bromophenyl isothiuronium salts of the formula:

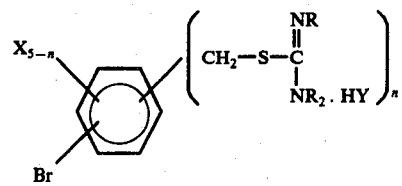

wherein:
each X substituent is independently selected from a group consisting of hydrogen, chlorine, bromine, alkyl, and haloalkyl, said alkyl containing 1 to 6 carbon atoms and said haloalkyl of 1 to 6 carbon atoms containing 1 to 3 halogen atoms, said halogen being independently selected from chlorine and bromine;
each Y substituent is independently selected from a group consisting of halogen, hydrogen phosphate, hydrogen sulfate, nitrate, acetate, alkali-metal phosphate, and alkali-metal sulfate;
each R substituent is independently selected from the group consisting of hydrogen, alkyl and haloalkyl, said alkyl containing 1 to 3 carbon atoms and said haloalkyl of 1 to 3 carbon atoms containing 1 to 3 halogen atoms, said halogen being selected from chlorine and bromine; and
$n$ is an integer from 1 to 5.

10. The polymeric composition according to claim 9 wherein said polymer is polyester.

11. The polymeric composition according to claim 9 wherein said polymer is polyurethane.

12. The polymeric composition according to claim 11 wherein the polyurethane is foamed.

13. The polymeric composition according to claim 9 wherein the polymer is a styrenic polymer.

14. The polymeric composition according to claim 13 wherein the polymer is polystyrene.

15. The polymeric composition according to claim 14 wherein the polystyrene is foamed.

16. The polymeric composition according to claim 15 wherein an enhancing agent selected from the group consisting of the oxides and halides of groups IV and V-A of the Periodic Table is also incorporated.

17. The polymeric composition according to claim 13 wherein said styrenic polymer is a styrene copolymer.

18. The polymeric composition according to claim 17 wherein said styrene copolymer is a styrene-butadiene copolymer.

19. The polymeric composition according to claim 17 wherein said styrene copolymer is a styrene-acrylonitrite copolymer.

20. The polymeric composition according to claim 17 wherein said styrenic polymer is a styrene terpolymer.

21. The polymeric composition according to claim 20 wherein said styrene terpolymer is a acrylo-nitrite-butadiene sytrene terpolymer.

22. A flame retardant polymeric composition containing a flame retarding amount of bromophenyl isothiuronium salts of the formula

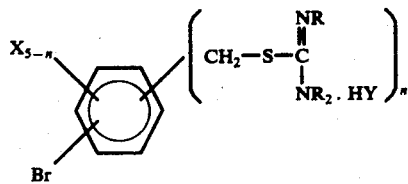

wherein:
each X substituent is independently selected from a group consisting of hydrogen, chlorine, bromine, alkyl, and haloalkyl, said alkyl containing 1 to 6 carbon atoms and said alkoalkyl of 1 to 6 carbon atoms containing 1 to 3 halogen atoms, said halogen being independently selected from chlorine and bromine;

each Y substituent is independently selected from a group consisting of halogen, hydrogen phosphate, hydrogen sulfate, nitrate, acetate, alkali-metal phosphate, and alkali-metal sulfate;

each R substituent is independently selected from the group consisting of hydrogen, alkyl and haloalkyl, said alkyl containing 1 to 3 carbon atoms and said haloalkyl of 1 to 3 carbon atoms containing 1 to 3 halogen atoms, said halogen being selected from chlorine and bromine; and $n$ is an integer from 1 to 5.